UNITED STATES PATENT OFFICE.

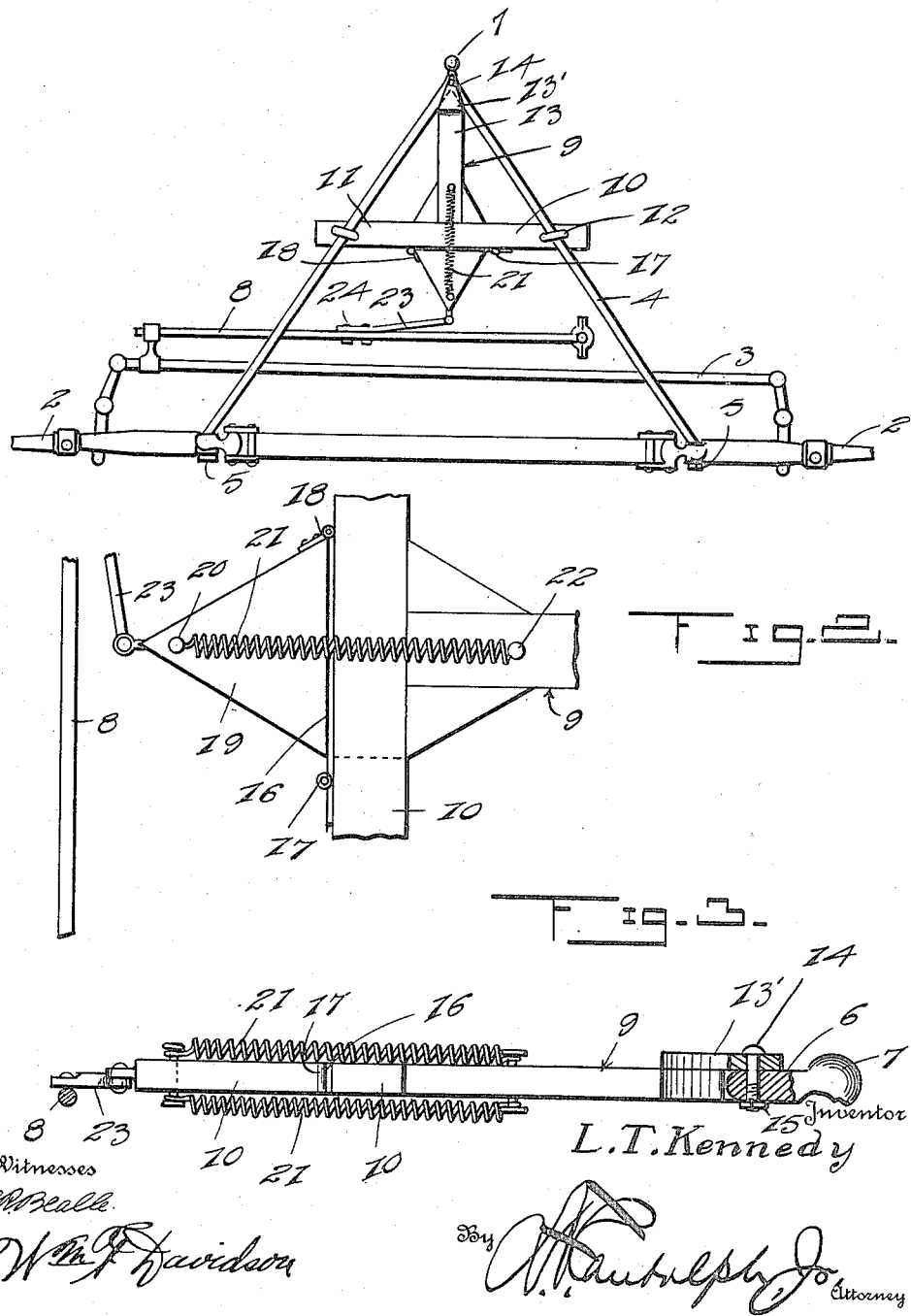

LEWIS T. KENNEDY, OF HANNIBAL, MISSOURI.

STEERING-GEAR ATTACHMENT.

1,215,168.   Specification of Letters Patent.   Patented Feb. 6, 1917.

Application filed February 23, 1916. Serial No. 79,983.

*To all whom it may concern:*

Be it known that I, LEWIS T. KENNEDY, a citizen of the United States, residing at Hannibal, in the county of Marion and State of Missouri, have invented certain new and useful Improvements in Steering-Gear Attachments; and I do hereby declare the following to be a full, clear, and exact description of the invention, such as will enable others skilled in the art to which it appertains to make and use the same.

This invention relates to attachments for steering gears for automobiles and has for its primary object to provide means attached to the steering gear for normally maintaining the front or steering wheels of an automobile in a straight path at all times, and which will automatically return the front or steering wheels to a straight path, after they have been turned at an angle by the operator, upon releasing the steering wheel.

An object of this invention is to provide a substantially triangular shaped block, hinged to a support and capable of swinging laterally of the support in either direction, according to which direction the front or steering wheels are turned, against the tension of a spring which will return the front or steering wheels into a straight path.

A further object of this invention is to provide a substantially T-shaped support, detachably secured to the radius rod of the automobile for hingedly supporting the triangular block in close relation to the steering gear, whereby said block may be attached to the steering gear, by a rod, to be swung upon its hinge against the tension of the spring carried by the block and support, to normally maintain the front or steering wheels in a straight path and, further, return them to the straight path after they have been turned to make a curve in the roadway.

A still further object of the invention is the provision of an attachment for steering gears of the above stated character, which shall be simple, durable, efficient and which can be manufactured and sold at a comparatively low cost.

With these and other objects in view as will become more apparent as the description proceeds, the invention consists in certain novel features and construction, combination and arrangement of parts as will be hereinafter more fully described and claimed.

For a complete understanding of my invention, reference is to be had to the following description and accompanying drawing, in which:—

Figure 1 is a top plan view of a front axle and radius rod of an automobile, illustrating my invention applied thereto, Fig. 2 is an enlarged fragmentary top plan view of my invention, removed from an automobile, and Fig. 3 is a side view of the support and block partly in section, illustrating the connection between the end of the support and the radius rod.

Referring in detail to the drawing, the numeral 1 indicates a front axle, having stub axles 2 secured to the ends thereof, which are connected by a connecting rod 3. Secured to the axle 1 is a V-shaped radius rod 4 by nuts 5. The apex of the radius rod 4 has formed thereon a shank 6, which terminates in a ball 7, that is secured to a crank case of an automobile. A steering rod 8 is connected to the connecting rod 3 and to a steering post and steering wheel (not shown). The foregoing description has reference to a construction employed upon an automobile known as the "Ford motor car" and to which my invention is applied.

Referring specifically to my invention, a substantially T-shaped support 9, constructed of metal or other suitable material is provided with its arms 10 and 11 secured to the V-shaped radius rod by suitable clips 12. The stem portion 13 of the T-shaped support is provided with its end reduced to fit within the apex of the radius rod 4 and an offset portion 13' is formed thereon and adapted to rest upon the apex of the radius rod 4 and the shank 6. The offset portion 13' is apertured to receive a bolt 14, which passes through the apex portion of the radius rod 4 and receives a nut 15. The bolt 14 and the clips 12 firmly secure the T-shaped support to the radius rod 4.

A plate 16 is hinged at one end to the arm 10 as illustrated at 17 and provided with a hinge 18 at its opposite end, which is secured to one corner of a triangular shaped block 19. Studs 20 are secured to the block 19 adjacent the apex thereof and have secured thereto coil springs 21, which have their opposite ends connected to studs 22 carried by the stem portion 13 of the T-shaped support 9, to normally hold the apex of the block 19 in alinement with the stem portion 13. A rod 23 is pivoted to the apex of the block 19 and rigidly secured to the steering rod 8 by means of bolts 24, to swing the block 19 upon the hinges 17 or 18, according to which direction the front or steering wheels of the automobile are turned.

In operation when the operator turns the front or steering wheels of the automobile by a steering wheel (not shown), to the right, the connecting rod 3 and the steering rod 8 move to the left, causing the block 19 to swing upon the hinge 17 against the tension of the springs 21 and when the operator releases the steering wheel the springs 21 will return the block 19 to its normal position, causing the front or steering wheels to assume a straight path. When the front or steering wheels are turned to the left, the block 19 will be swung upon the hinge 18 against the tension of the springs 21 and will be returned to its normal position by the springs 21, causing the wheels to return to a straight path, when the operator releases the steering wheel.

While I have shown and described the preferred embodiment of my invention, it will be understood that minor changes in construction, combination and arrangement of parts may be made without departing from the spirit and scope of the invention as claimed.

Having thus described my invention, what I claim is:—

1. A device of the character described comprising a substantially T-shaped support, a plate hinged to said support, a triangular block hinged to said plate, means for attaching the apex of said triangular block to the steering gear of the automobile, and tension means secured to the block and support for normally holding and returning the front wheels of the automobile to a straight path.

2. A device of the character described comprising a substantially T-shaped support secured to the radius rod of an automobile, a plate hinged at one end thereof to the support, a substantially triangular block hinged to the other end of said plate and adapted to normally rest upon said plate, a rod pivoted to the apex of said triangular block and connected to the steering gear of the automobile, and tension means secured to the block and support for normally holding and returning the front wheels of the automobile to a straight path.

3. In combination with a V-shaped radius rod of an automobile, a substantially T-shaped support including a stem and horizontal arms, clips secured to said arms and to the radius rod, the free end of said stem reduced to fit into the apex of said radius rod, an off-set portion formed on said stem and adapted to overlie and be secured to the apex portion of the radius rod, a block hinged to said arms, means for connecting said block to the steering gear of an automobile, and tension means secured to the block and said stem for normally holding and returning the front wheels of the automobile to a straight path.

In testimony whereof I affix my signature in presence of two witnesses.

LEWIS T. KENNEDY.

Witnesses:
E. F. MORGELS,
J. M. DICKMAN.

Copies of this patent may be obtained for five cents each, by addressing the "Commissioner of Patents, Washington, D. C."